(12) United States Patent
Chen

(10) Patent No.: US 11,994,429 B2
(45) Date of Patent: May 28, 2024

(54) METHOD FOR CALIBRATING OPTICAL SENSOR, OPTICAL SENSOR AND RELATED ELECTRONIC DEVICE

(71) Applicant: BEIJING XIAOMI MOBILE SOFTWARE CO., LTD., Beijing (CN)

(72) Inventor: Chaoxi Chen, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 331 days.

(21) Appl. No.: 17/385,436

(22) Filed: Jul. 26, 2021

(65) Prior Publication Data
US 2022/0299368 A1    Sep. 22, 2022

(30) Foreign Application Priority Data

Mar. 22, 2021    (CN) .......................... 202110304311.7

(51) Int. Cl.
| | | |
|---|---|---|
| *G01J 3/30* | (2006.01) | |
| *G01J 1/42* | (2006.01) | |
| *G01J 5/02* | (2022.01) | |
| *G01J 5/60* | (2006.01) | |
| *G01J 3/28* | (2006.01) | |
| *G01J 5/80* | (2022.01) | |

(52) U.S. Cl.
CPC ............... *G01J 3/30* (2013.01); *G01J 1/4204* (2013.01); *G01J 5/025* (2013.01); *G01J 5/60* (2013.01); *G01J 2003/283* (2013.01); *G01J 5/80* (2022.01)

(58) Field of Classification Search
CPC ....... G06T 7/90; G01J 2003/2823; G01J 5/80; G01J 5/60; G01J 1/4204; G01J 3/30; G01J 2003/283
See application file for complete search history.

(56) References Cited

FOREIGN PATENT DOCUMENTS

| | | | | |
|---|---|---|---|---|
| CN | 105651381 A | 6/2016 | | |
| EP | 3772873 A1 * | 2/2021 | ............ | H05B 45/22 |
| JP | 2004157062 A | 6/2004 | | |

OTHER PUBLICATIONS

Rick Rys, "What is LAB Color Space? [HD]" https://www.youtube.com/watch?v=3bY8MVHf0JM, Nov. 16, 2012 (Year: 2012).*
European Patent Application No. 21188384.8, Search and Opinion dated Jan. 19, 2022, 7 pages.

* cited by examiner

*Primary Examiner* — Maurice C Smith
(74) *Attorney, Agent, or Firm* — COZEN O'CONNOR

(57) ABSTRACT

The present disclosure relates to a method for calibrating an optical sensor, an optical sensor and a related electronic device. The method includes: acquiring a plurality of spectral detection values of ambient light collected by the optical sensor; acquiring a plurality of first parameter detection values of the ambient light and the corresponding plurality of second parameter detection values according to the plurality of spectral detection values, a type of the first parameter detection values being different from a type of the second parameter detection values; determining at least one effective detection value from the plurality of first parameter detection values according to the plurality of second parameter detection values; and calibrating the optical sensor according to the at least one effective detection value.

20 Claims, 4 Drawing Sheets

US 11,994,429 B2

METHOD FOR CALIBRATING OPTICAL SENSOR, OPTICAL SENSOR AND RELATED ELECTRONIC DEVICE

CROSS REFERENCE TO RELATED APPLICATION

This application is based on and claims priority to Chinese patent application No. 202110304311.7, filed on Mar. 22, 2021, the entire content of which is incorporated herein by reference.

TECHNICAL FIELD

The present disclosure relates a field of sensor calibration technologies, particularly to a method for calibrating an optical sensor, an optical sensor and a related electronic device.

BACKGROUND

As sensors are more widely used in mobile electronic devices, accuracy requirements for the sensors is also increasing. However, since the parameters sensed by the sensors are vary greatly from the standard values due to the diversity of environments where mobile electronic devices are used, the sensors typically need to be calibrated upon delivery. Calibrating the sensors, especially optical sensors, requires a constant standard environment, for example, the optical sensors require to be calibrated with a light source in a darkroom. This environment can be difficult to replicate outside a factory or other controlled location.

SUMMARY

According to a first aspect of embodiments of the present disclosure, a method for calibrating an optical sensor is provided. The method includes: acquiring a plurality of spectral detection values of ambient light collected by the optical sensor; acquiring a plurality of first parameter detection values of the ambient light and a plurality of second parameter detection values of the ambient light according to the plurality of spectral detection values, a type of the first parameter detection values being different from a type of the second parameter detection values; determining at least one effective detection value from the plurality of first parameter detection values according to the plurality of second parameter detection values; and calibrating the optical sensor according to the at least one effective detection value.

According to a second aspect of the embodiment of the present disclosure, an optical sensor is further provided. Optical parameters of the optical sensor are calibrated according to a method for calibrating an optical sensor, and the method includes: acquiring a plurality of spectral detection values of ambient light collected by the optical sensor; acquiring a plurality of first parameter detection values of the ambient light and a plurality of second parameter detection values of the ambient light according to the plurality of spectral detection values, a type of the first parameter detection values being different from a type of the second parameter detection values; determining at least one effective detection value from the plurality of first parameter detection values according to the plurality of second parameter detection values; and calibrating the optical sensor according to the at least one effective detection value.

According to a third aspect of the embodiment of the present disclosure, an electronic device is further provided. The device includes an optical sensor. Optical parameters of the optical sensor are calibrated according to a method for calibrating an optical sensor, and the method includes: acquiring a plurality of spectral detection values of ambient light collected by the optical sensor; acquiring a plurality of first parameter detection values of the ambient light and a plurality of second parameter detection values of the ambient light according to the plurality of spectral detection values, a type of the first parameter detection values being different from a type of the second parameter detection values; determining at least one effective detection value from the plurality of first parameter detection values according to the plurality of second parameter detection values; and calibrating the optical sensor according to the at least one effective detection value.

It should be noted that, the details above and in the following are exemplary and illustrative, and do not limit on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

Figure 1:
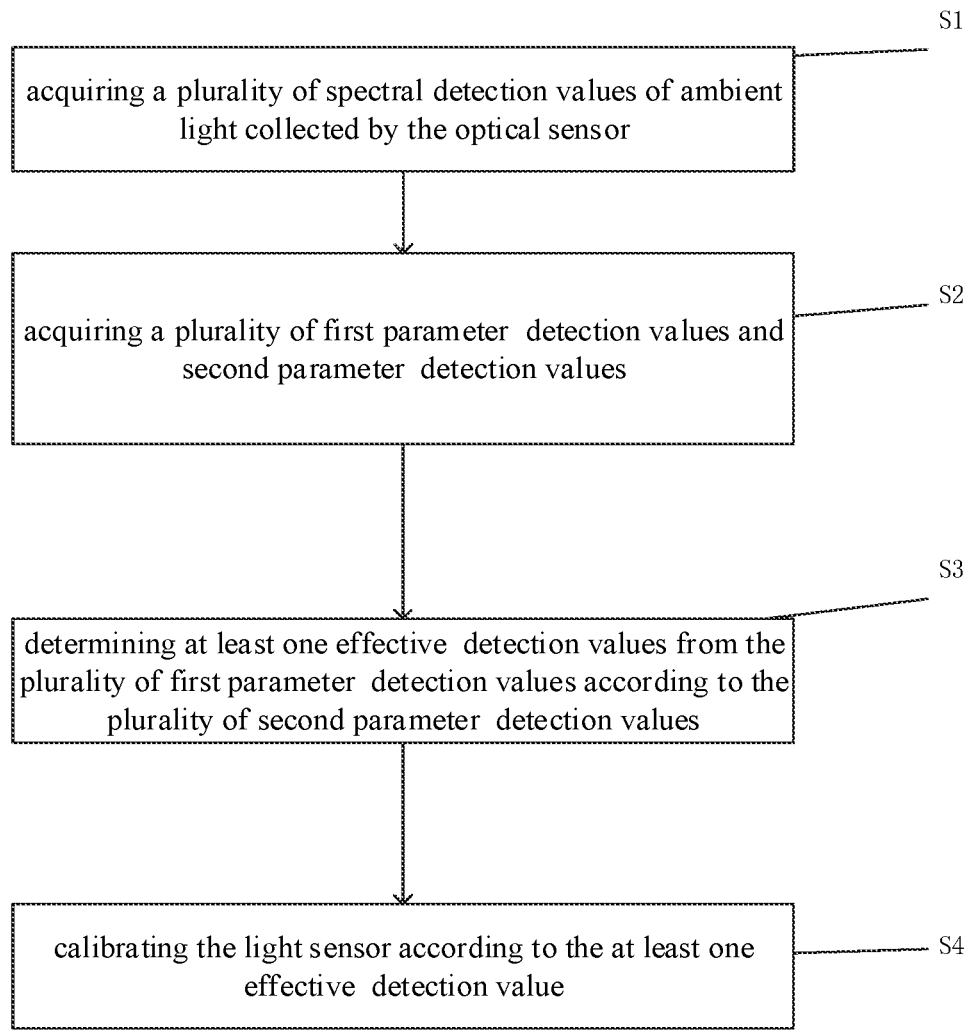
FIG. 1 is a flow chart illustrating a method for calibrating parameters in embodiments of the present disclosure.

FIG. 1 is a flow chart illustrating a method for calibrating parameters in embodiments of the present disclosure. In embodiments, the method includes calibrating an optical sensor. The following is a description of blocks of the embodiment. In a process of calibrating, at block S1, a plurality of spectral detection values of ambient light collected by the optical sensor are acquired. The spectral detection values may be acquired by measuring a spectral value multiple times at different wavebands or one spectral waveband, which will not be limited in the embodiments. After the plurality of spectral detection values are acquired, go to block S2. At block S2, first parameter detection values and second parameter detection values are obtained by calculating according to the spectral detection values. Since the first parameter detection values and the second parameter detection values have a fixed function relationship with the spectral detection values, the first parameter detection values and the second parameter detection values corresponding to the spectral detection values are obtained by calculating by a formula after the optical sensor detects the spectral detection values. The first parameter detection values and the second parameter detection values may include illumination intensity, a color temperature and a stroboscopic value, which will not be limited in the embodiment. Then go to block S3. At block S3, the second parameter detection values may include a determination criterion, and at least one corresponding first parameter detection value is selected. Understandably, since the second parameter detection values are configured to screen the first parameter detection value available for calibrating, a type of the first parameter detection values is different from a type of the second parameter detection values. For example, when a fluctuation range of any second parameter detection value conforms to a standard, it is determined that a test environment is in a stable state, and when the fluctuation range exceeds the standard, it is determined that the test environment is not suitable for test, and the corresponding first parameter detection value may not be an effective detection value. Then go to block S4, the optical sensor is calibrated according to the screened effective first parameter detection value.

In the above embodiment, in a process of calibrating a first parameter for the optical sensor, a second parameter is introduced for determination of the ambient light source condition, to ensure that calibrating data of the optical sensor is in a reasonable range to avoid introducing the parameters obtained when the ambient light source is not stable.

Figure 2:
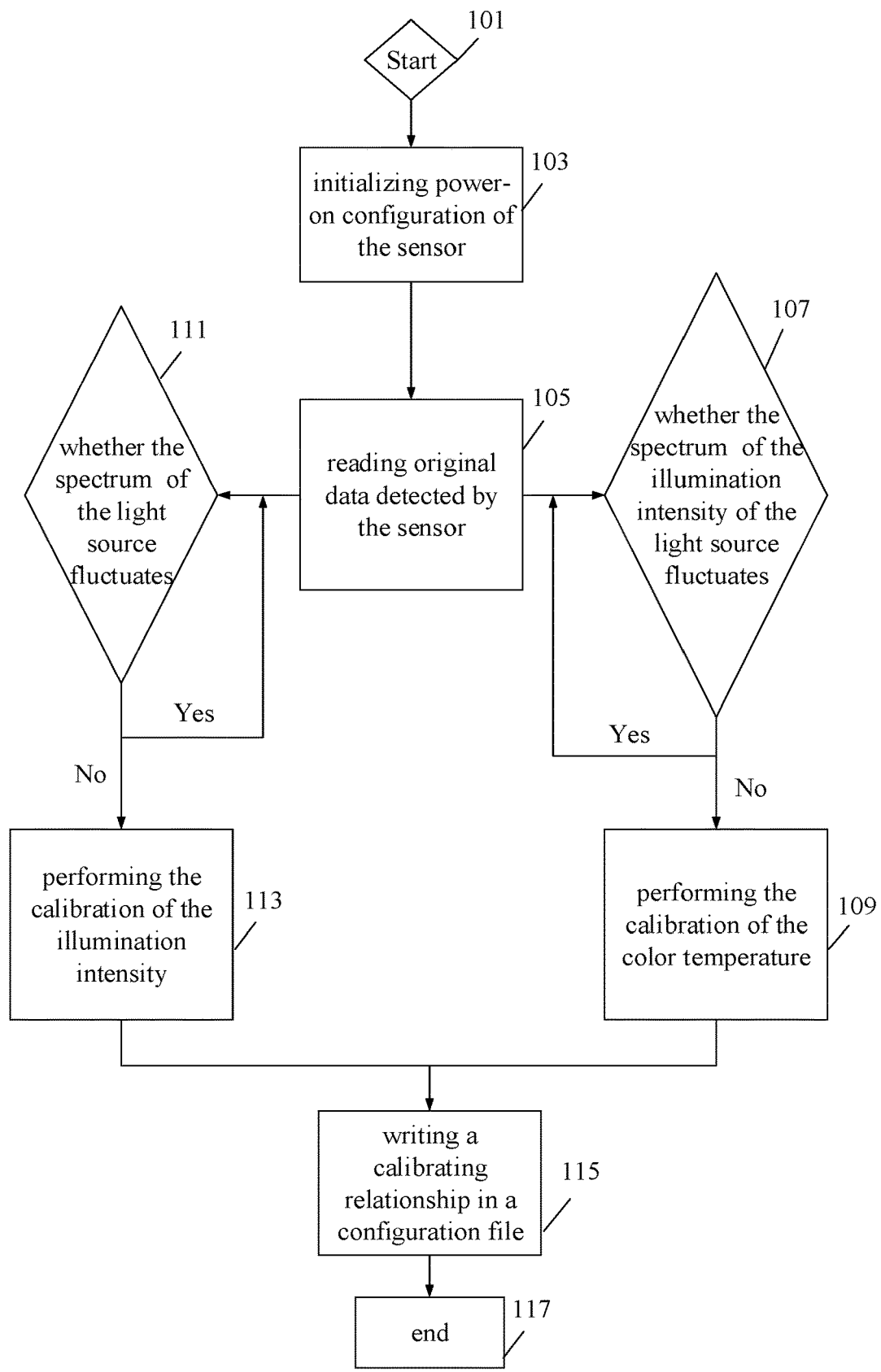
FIG. 2 is a flow chart illustrating a method for calibrating parameters in embodiments of the present disclosure.

FIG. 2 is a flow chart illustrating a method for calibrating an optical sensor in embodiments of the present disclosure. As illustrated in FIG. 2, the method for calibrating an optical sensor includes the following blocks. When a calibrating target is an illumination intensity, the following blocks are executed.

At block 101, a calibration is started.

At block 103, power-on configuration of the sensor is initialized.

At block 105, original data detected by the sensor is read. As illustrated in FIG. 2, different calibrating methods may be selected according to types of parameters to be calibrated. For example, an illumination intensity calibration is performed by monitoring whether spectrum of the light source fluctuates, or a color temperature calibration is performed by monitoring whether the illumination intensity of the light source fluctuates, and selecting of the specific types of the parameters will not be limited in embodiments of the present disclosure.

At block 111, it is determined whether the spectrum of the light source fluctuates, and when it is determined that the spectrum fluctuates, the determination of whether the spectral detection value fluctuates is repeated.

Whether or not the spectrum fluctuates may be determined via the spectral detection values itself or reflected by the color temperature detection values and the stroboscopic detection values having a functional relationship with the spectral detection values. That is, when a fluctuation of the color temperature detection value or the stroboscopic detection value exceeds a certain range, it is determined that the spectrum fluctuates.

In addition, in an embodiment, when the spectral fluctuates within a preset interval, for example, within plus or minus 5% with respect to a reference value, it is determined that the spectrum does not fluctuate.

At block 113, when the spectrum of the light source does not fluctuate, calibration of the illumination intensity is executed.

In embodiments of the present disclosure, a way for calibrating the illumination intensity may be obtaining a calibrating relationship based on a numeric difference between a reference illumination intensity value and an illumination intensity detection value, and/or a function relationship between a curve of the reference illumination intensity value and a curve of the illumination intensity detection value under different spectrums. For example, a calibrated illumination intensity value close to the reference illumination intensity value may be obtained according to a product of a calibrating coefficient K and the illumination intensity detection value.

During a calibrating procedure, the plurality of spectral detection values of the ambient light and the plurality of corresponding illumination intensity detection values may be acquired according to the plurality of spectral detection values. At least one effective detection value is determined from the plurality of illumination intensity detection values according to the plurality of spectral detection values. The optical sensor is calibrated according to the at least one effective detection value.

At block 115, the calibrating relationship obtained after completing the calibration is written in a configuration file. Understandably, the calibrating relationship may be a calibrating function corresponding to each illumination intensity detection value under different spectrums to obtain a more accurate illumination intensity calibrating value, or the constant calibrating coefficient K for the sensor to reduce computation and simplify a work procedure.

At block 117, calibrating the illumination intensity is ended.

In another embodiment, as illustrated in FIG. 2, when the calibrating target is a color temperature, the following blocks are executed.

At block 101, a calibration is started.

At block 103, power-on configuration of the sensor is initialized.

At block 105, original data detected by the sensor is read.

At block 107, it is determined whether the illumination intensity of the light source fluctuates, and when it is determined that the illumination intensity fluctuates, repeatedly detect whether the illumination intensity detection value fluctuates.

Whether or not the illumination intensity detection value fluctuates may be determined via the illumination intensity detection values itself or reflected by the spectral detection values and the stroboscopic detection values having functional relationship with the illumination intensity detection values. That is, when a fluctuation of the spectral detection value or the stroboscopic detection value exceeds a certain range, it is determined the illumination intensity fluctuates. When the illumination intensity constantly fluctuates, a system may send an alarm to make adjustment in time.

In addition, in an embodiment, when the illumination intensity fluctuates within a preset interval, for example, within plus or minus 5% with respect to a reference value, it is determined that the illumination intensity does not fluctuate.

At block 109, when the illumination intensity of the light source does not fluctuate, calibration of the color temperature is executed.

In embodiments of the present disclosure, a way for calibrating the color temperature may be obtaining a calibrating relationship based on a numeric difference between a reference color temperature value and a color temperature detection value and/or a function relationship between a curve of the reference color temperature value and a curve of the color temperature detection value under different illumination intensities. For example, a calibrating color temperature value close to the reference color temperature value may be obtained according to a product of a calibrating coefficient Coeffi and the color temperature detection value.

During a calibrating procedure, a plurality of color temperature detection values of the ambient light and the plurality of corresponding illumination intensity detection values may be acquired according to the plurality of spectral detection values. At least one effective detection value is determined from the plurality of color temperature detection values according to the plurality of illumination intensity detection values. The optical sensor is calibrated according to the at least one effective detection value.

At block 115, the calibrating relationship obtained after completing the calibration is written in a configuration file. Understandably, the calibrating relationship may be a calibrating function corresponding to each color temperature detection value under different illumination intensities, to acquire a more accurate color temperature calibrating value, or the constant calibration coefficient Coeffi for the sensor to reduce computation and simplify a work procedure.

At block 117, calibrating the color temperature is ended.

It may be understood that, a stroboscopic calibration, may be performed according to blocks of the above embodiments. When calibrating one detection value of the illumination intensity, the color temperature, the stroboscopic value and the spectrum, other parameters may be configured to monitor a change of the light source to better recognize a change of a calibrating environment.

The method provided in the embodiments is configured for calibrating the optical sensor. When the optical sensor or an electronic device provided with the optical sensor enters a detection environment, the optical sensor is started or initialized to enter an operating state. When the optical sensor is in the operating state, data collection may be performed on the current ambient light source, including one or more of the illumination intensity detection value, the color temperature detection value, the color temperature detection value and the stroboscopic detection value. When the collected data is the illumination intensity detection value, changing conditions of the color temperature and the stroboscopic value may be gotten based on the illumination intensity detection value, according to a illumination intensity Lux calculation formula, a color temperature CCT calculation formula and a stroboscopic FFT calculation formula. Therefore, in a stable test environment, when the color temperature detection value and/or the stroboscopic detection value appears to make an abnormal change, it may reflect that the illumination intensity changes, and at this time, it may be determined that other parameters determined based on the illumination intensity are unavailable.

Therefore, the first parameter detection values and second parameter detection values of the ambient light may be obtained based on the illumination intensity detection value. When the second parameter detection values do not satisfy a preset second condition, it reflects that the illumination intensity changes, and it may be determined that other parameters determined based on the illumination intensity are unavailable. At this time, collecting and/or analyzing the first parameter detection values are stopped or suspended, or the first parameter detection values collected when not satisfying the preset second condition are not adopted to prevent from calibrating based on incorrect parameters. When the second parameter detection value satisfies the preset second condition, the optical sensor is calibrated according to the collected first parameter detection value.

In some embodiments, determining the at least one effective detection value from the plurality of first parameter detection values according to the plurality of second parameter detection values, includes: when any second parameter detection value satisfies a preset interval, determining the first parameter detection value corresponding to the second parameter detection value as the effective detection value.

The preset interval reflects an acceptable fluctuation range of the second parameter detection values beyond a test standard, which may include the numerical fluctuation of the second parameter detection values being greater than a preset first fluctuation within a preset first time range. For example, within 3 s, the fluctuation of the color temperature is beyond ±20%, the fluctuation of the illumination intensity is beyond ±20 lux or the fluctuation of the stroboscopic value is beyond ±10%. At this time, it may be determined not to satisfy the preset second condition, and the first parameter detection value is in an unavailable state.

In some embodiments, the method further includes: determining whether any first parameter detection value and a corresponding second parameter detection value satisfy a function relationship e; when determining to satisfy the function relationship, determining the first parameter detection value corresponding to the second parameter detection value as the effective detection value. Specifically, a calculation formula of the illumination intensity is Lux=K*(k1*ch1+k1*ch2+ . . . kn*chn), and a calculation formula of the color temperature is CCT=Coeffi.*(chn'/chm')+offset, both of which may be obtained based on the spectral detection values (ch1, ch2, . . . , chn). And K is the calibrating coefficient, k1, k2 . . . kn are proportion coefficients, ch1, ch2 . . . chn, chn' and chm' are the spectral detection values of respective channels, Coeffi is a principal component coefficient and offset is a compensation value. It may be understood that, when the spectrum does not fluctuate, both of the illumination intensity detection value and the color temperature detection value are stable and maintain a certain function relationship, and when the function relationship is stable, it may be determined the ambient light is in a stable state, and the first parameter detection value corresponding to the second parameter detection value may be determined as the effective detection value.

In some embodiments, when the plurality of spectral detection values of the ambient light collected by the sensor are acquired, the method further includes: acquiring a plurality of collection values collected by the optical sensor at a plurality of time points. The fluctuation of the ambient light at each time point may be reasonably inferred according to detecting of the plurality of time points. At this time, the spectral detection values are generated according to the plurality of collection values to more accurately reflect whether the ambient light is stable.

It may be understood that, the first parameter detection value is one of the illumination intensity detection value, the color temperature detection value, the stroboscopic detection value, and the spectral detection value, and the second parameter detection value is one of the illumination intensity detection value, the color temperature detection value, the stroboscopic detection value, and the spectral detection value. The type of the first parameter detection value is different from the type of second parameter detection value.

Even though a single parameter may reflect the change of the illumination intensity, when the test item is a same parameter, the parameter may change due to the change of the ambient light, and the parameter calculated according to the data collected by the optical sensor may change, which may be reflected by any parameter, and the calibration does not perform at this time, or a calibrating value is discarded, or collecting the current data directly stops. However, the parameter may change due to a performance problem of the optical sensor itself. When the sensor itself occurs the problem, in a case of converting the illumination intensity detection value to the color temperature detection value not occurring any problem, the color temperature detection value does not fluctuate, which may reflect that it is a problem of the sensor itself rather than a problem of the ambient light. At this time, a feedback may be achieved with a parameter different from the test item to check out unqualified products. Therefore, the type of the first parameter detection value and the type of the second parameter detection value are different so as to perform parameter calibration more accurately.

In some embodiments, a numerical fluctuation value of the second parameter detection value is acquired within a preset first time range, for example, within 10 s; when the numerical fluctuation value of the second parameter detection value is less than or equal to a preset first threshold, the first parameter detection value corresponding to the second parameter detection value is determined as the effective detection value. The fluctuation of the second parameter detection value is limited within a certain time, which may prevent scrapping of the detection values of a whole time period due to an accidental fluctuation of the light source, and enhance efficiency of the test.

The preset interval reflects an acceptable fluctuation range of the second parameter detection values beyond a test standard, which may include the numerical fluctuation of the second parameter detection values being greater than a preset first fluctuation within a preset first time range. For example, within 3 s, the fluctuation of the color temperature is beyond ±20%, the fluctuation of the illumination intensity is beyond ±20 lux or the fluctuation of the stroboscopic value is beyond ±10%. At this time, it may be determined not to satisfy the preset second condition, and the first parameter detection value is in an unavailable state.

In some embodiments, the function relationship may be obtained by: acquiring a standard value of the first parameter detection value; obtaining a function relationship between the first parameter detection value and the standard value according to the standard value.

In detail, since the light source includes a plurality of wavebands of spectrums, when collecting original data, the spectrums may be divided into a plurality of channels, for example, n channels, and respective channels includes different ranges of optical wavebands, at this time, n channels of spectral detection values are collected by the optical sensor, and required parameters may be calculated more accurately according to a parameter calculation formula and spectral detection value and a proportion of each channel. When one optical sensor is configured to detect a light source L with a preset illumination intensity, data of n spectral channels is collected for calibration, a calculation formula of the illumination intensity is Lux=K*(k1*ch1+k1*ch2+ ... kn*chn), and a calculation formula of the color temperature is CCT=Coeffi.*(chn'/chm')+offset. K is a calibrating coefficient, k1, k2 ... kn are proportion coefficients, ch1, ch2 ... chn, chn' and chm' are spectral detection values of respective channels, Coeffi is a principal component coefficient and offset is a compensation value. For multi-optical wavebands of n channels, the proportion of each channel of n wavebands is set to Ri (i=1, 2, 3, 4, ..., n)=chi/(ch1+ch2+chn). When the proportion value of any channel at a certain moment changes, the calculation value of the test color temperature is determined to be in an untrusted state.

In some embodiments, the method for calibrating the optical sensor of the present disclosure further includes writing in a chip; acquiring a standard value of the first parameter detection value, the standard value being a parameter value of a gold machine, and on the basis of the method, obtaining a function relationship between the first parameter detection value and the standard value according to the standard value; and burning the function relationship, and at the moment, the optical sensor may be in a same parameter standard with the gold machine, to achieve a reaction standard of the gold machine when in use. By the function relationship, the optical sensor may obtain the first parameter detection value in the real environment according to the external environment, and calculate and obtain a calibrating value of the corresponding first parameter detection value.

In some embodiments, when the second parameter detection value of the ambient light is less than a preset second threshold, one or more values of the illumination intensity value, the color temperature value and the stroboscopic value of the ambient light may be collected and detected through an illuminometer, and a standard value is replaced according to the one or more detected values. The fluctuation or aging of the ambient light source does not imply that the light source is not available, when the ambient light source is 500 lux, the optical sensor is calibrated with 500 lux, and when the ambient light source is 400 lux, the optical sensor may also be calibrated with 400 lux, which are different in the calculation formula and calibration coefficient. Therefore, when the second parameter detection value of the ambient light is less than the preset second threshold, the color temperature of the ambient light source is collected and detected, such as the color temperature detection value may be detected and obtained through the illuminometer, and the standard of the calibration is replaced according to the color temperature detection value, such as the replacement of the calibration coefficient, so that the current color temperature detection value may also be configured to perform the parameter calibration as a reference value, and a service life of the ambient light source is prolonged.

In some embodiments, the method further includes: determining whether a current illumination intensity detection value of the ambient light is stable. Even if the light source is aging, or the performance of the light source gradually decreases, but when the light source is stable within a certain range, or the aging curve of the light source is predictable, the light source may further be configured for testing to prolong the service life of the light source. Therefore, when the illumination intensity detection value is stabilized within a third threshold during a preset second time range, or the collected illumination intensity detection value is linearly changed, it is determined that the current illumination intensity detection value is stable.

In some embodiments, the corresponding relationship of the parameters in the method for calibrating the optical sensor may be: when the first parameter detection value is a color temperature detection value, the second parameter detection value is an illumination intensity detection value; or, when the first parameter detection value is an illumination intensity, the second parameter detection value is a illumination intensity detection value. It may be understood that, the corresponding relationship is only an embodiment of the present disclosure and does not limit the scope of the claim of the present disclosure.

When the collected data is the illumination intensity detection value, the color temperature detection value and the stroboscopic detection value may be got based on the illumination intensity detection value, according to the illumination intensity Lux calculation formula, the color temperature CCT calculation formula and the stroboscopic FFT calculation formula. Therefore, in the stable test environment, when the color temperature detection value and the stroboscopic detection value have the abnormal change, it may reflect that the illumination intensity changes, and at this time, it may be determined that other parameters determined based on the illumination intensity detection value are unavailable.

Therefore, the first parameter detection values and the second parameter detection values of the ambient light may be obtained based on the illumination intensity detection value. When the first parameter detection values do not satisfy the preset first condition, it reflects that the illumination intensity changes, and it may be determined that other parameters determined based on the illumination intensity are unavailable, at this time, collecting and/or analyzing the second parameter detection values is stopped or suspended, or the second parameter detection values collected when not satisfying the preset second condition are not adopted to prevent from calibrating based on incorrect parameters. When the first parameter detection value satisfies the preset first condition, the optical sensor is calibrated according to the collected second parameter detection value.

It may be understood that a third parameter detection value not related with the current calibrating value may be introduced. A technical effect of monitoring environment of the present disclosure may achieve by monitoring the third parameter detection value. The third parameter detection value may be one of the illumination intensity, the color temperature, the stroboscopic value and the illumination intensity, and a type of the third parameter detection value is different from the types of the first parameter detection value and the second parameter detection value.

Taking calibrating the color temperature and the illumination intensity as an example, when calibrating the color temperature, a change of the ambient light may be monitored through the illumination intensity; when calibrating the illumination intensity, the change of the ambient light may be monitored through the color temperature; and when calibrating the color temperature and the illumination intensity simultaneously, the color temperature and the illumination intensity may be configured as monitoring parameters for each other, to achieve an effect of calibration outputting together. In addition, the stroboscopic value may also be introduced to monitor the ambient light with non-calibrating data when the color temperature and the illumination intensity are calibrated simultaneously.

According to the embodiment, when the optical sensor is calibrated, one or more values of the illumination intensity, the color temperature and the stroboscopic value may be simultaneously tested, and through the calibration of the environment, false determination caused by the ambient light may be reduced, and calibrating efficiency may be improved.

In embodiments of the present disclosure, when calibrating, within a light box with a light source value Lux, any apparatus calculates an illumination and the color temperature as an original illumination intensity lux' and a color temperature cct', based on the foregoing Lux calculation formula and the CCT calculation formula by a calculation formula, by inputting binary bit value of the original data collected by the optical sensor to the calculation formulas. The color temperature value CCT of the ambient light is fixed, then the system will continuously read the original illumination intensity lux' and the color temperature cct' n times as a calculating value, and then multiply a numerical value K, or add or minus an offset value to obtain the calibrated Lux and CCT to achieve the calibration to the calibrated Lux and CCT.

Based on the method disclosed by the present disclosure, when the color temperature is normally detected, under a same illumination intensity, the illumination intensity function is fixed, that is, the color temperature value detected by each channel of the optical sensor is constant, and since the color temperature calculation formula coefficient is fixed, the color temperature does not change. However, when the light source is gradually aged and the illumination intensity is suddenly changed at a certain moment, it may be determined whether the illumination intensity is changed based on the color temperature calculation formula, so as to determine whether the color temperature value is truly reliable, to prevent calibrating the optical sensor from introducing a wrong coefficient.

On the other hand, when the value calculated by the color temperature value is stable and unchanged, the calculation fluctuation of the color temperature is considered to be accurate, the fluctuation of the color temperature light source at a certain moment is large, and the value of the color temperature reflects that the collected value is untrusted, so that the untrusted value is avoided.

By the above method for calibrating the optical sensor, each parameter may be a discrimination condition when the other parameter is calibrated, which may provide accurate calibration of the illumination intensity, the color temperature, the stroboscopic value and other physical quantities for the device.

Figure 3:
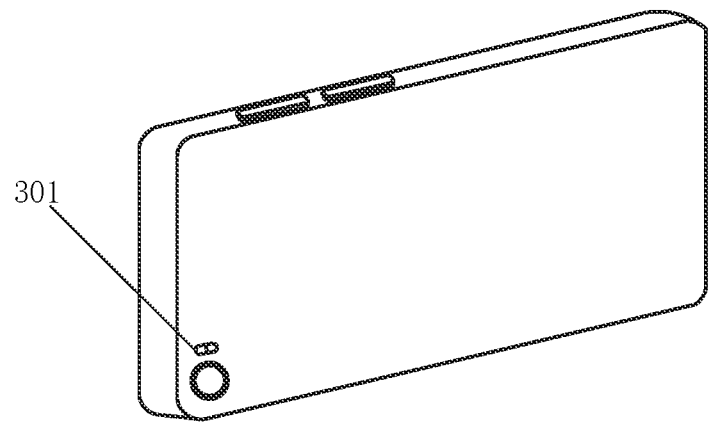
FIG. 3 is a schematic diagram illustrating an electronic device in embodiments of the present disclosure.

In one embodiment, as illustrated in FIG. 3, the present disclosure further discloses an electronic device and an optical sensor 301 calibrated by any one method of the present disclosure.

Figure 4:
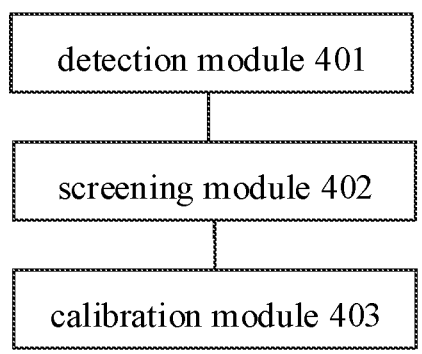
FIG. 4 is a block diagram illustrating an apparatus for calibrating according to an example embodiment.

In one embodiment, as illustrated in FIG. 4, an apparatus for calibrating an optical sensor is provided. The apparatus includes: a detection module 401, configured to acquire a plurality of spectral detection values of ambient light collected by the optical sensor, and acquire a plurality of first parameter detection values of the ambient light and the corresponding plurality of second parameter detection values according to the plurality of spectral detection values, a plurality of second parameter detection values of the ambient light according to the plurality of spectral detection values; a screening module 402, configured to determine at least one effective detection value from the plurality of first parameter detection values according to the plurality of second parameter detection values; and a calibration module 403, configured to calibrate the optical sensor according to the at least one effective detection value.

The calibration apparatus may be configured as a box with an ambient light source arranged inside, a illumination intensity, a color temperature and other optical parameters of the light source may be set to a fixed value, such as intensity illumination intensity of 400 Lux (lux, a unit for measuring the illumination intensity), a color temperature of 5000 K (a unit for measuring the color temperature). a non-reflective material is coated inside the box to prevent light of the light source from entering the optical sensor through reflection and causing interference of light superposition. When each optical sensor or electronic device manufactured in a same standard is calibrated, a parameter of the ambient light source is kept stable.

In a process of calibrating, the detection module acquires the plurality of spectral detection values of the ambient light collected by the optical sensor. The spectral detection values may be acquired by measuring a spectral value multiple times at different wavebands, or one wave band, which will not be limited in the embodiments. After the plurality of spectral detection values are acquired, the screening module acquires the first parameter detection values and the second parameter detection values by calculating according to the spectral detection values. Since the first parameter detection values and the second parameter detection values have a fixed function relationship with the spectral detection value, the first parameter detection values and the second parameter detection values corresponding to the spectral detection values are obtained by calculating by a formula after the optical sensor detects the spectral detection values. The first parameter detection values and the second parameter detection values may be an illumination intensity, a color temperature and a stroboscopic value, which will not be limited in the embodiment. The second parameter detection values are as a determination criterion, and at least one corresponding first parameter detection value is selected. Understandably, since the first parameter detection value is configured to screen the second parameter detection value available for calibration, a type of the first parameter detection values is different from a type of the second parameter detection values. For example, when a fluctuation range of any second parameter detection value conforms to a standard, it is determined that a test environment is in a stable state, and when the fluctuation range exceeds the standard, it is determined that the test environment is not suitable for test, and the corresponding first parameter detection value may not be as the effective detection value. The calibration module calibrates the optical sensor according to the screened effective first parameter detection value.

In some embodiments, the screening module 402 determines the at least one effective detection value from the plurality of first parameter detection values according to the plurality of second parameter detection values, and is configured to when the second parameter detection value satisfies a preset interval, determine the first parameter detection value corresponding to the second parameter detection value as the effective detection value.

The preset interval reflects an acceptable fluctuation range of the second parameter detection values beyond a test standard, which may include the numerical fluctuation of the second parameter detection values being greater than a preset first fluctuation within a preset first time range. For example, within 3 s, the fluctuation of the color temperature is beyond ±20%, the fluctuation of the illumination intensity is beyond ±20 lux or the fluctuation of the stroboscopic value is beyond ±10%. At this time, it may be determined not to satisfy the preset second condition, and the first parameter detection value is in an unavailable state.

In some embodiments, the screening module 402 is further configured to detect whether any first parameter detection value and a corresponding second parameter detection value satisfy a function relationship; when determining to satisfy the function relationship, determine the first parameter detection value corresponding to the second parameter detection value as the effective detection value. The details are described as embodiments of the method, which are not repeated here.

It may be understood that, the first parameter detection value obtained by the detection module is one of an illumination intensity detection value, a color temperature detection value, a stroboscopic detection value, and a spectral detection value, and the second parameter detection value is one of a illumination intensity detection value, a color temperature detection value, a stroboscopic detection value, and a spectral detection value. The type of the first parameter detection values is different from the type of the second parameter detection values.

In some embodiments, the screening module 402 is further configured to: acquire a numerical fluctuation value of the second parameter detection value within a preset first time range, for example, within 10 s; when the numerical fluctuation value of the second parameter detection value is less than or equal to a preset first threshold, determine the first parameter detection value corresponding to the second parameter detection value as the effective detection value. The fluctuation of the second parameter detection value is limited within a certain time, which may prevent scrapping of the detection value of a whole time period due to an accidental fluctuation of the light source, and enhance efficiency of the test.

In some embodiments, the functional operation of the screening module 402 may correspond to: acquiring a standard value of the first parameter detection value; obtaining a function relationship between the first parameter detection value and the standard value according to the standard value.

In some embodiments, the detection module 401 may adjust the standard value for calibrating according to the change of the ambient light. When the second parameter detection value of the ambient light is less than a preset second threshold, one or more values of the illumination intensity value, the color temperature value and the stroboscopic value of the ambient light may be collected and detected through an illuminometer, and a standard value is replaced according to the one or more detected values. The fluctuation or aging of the ambient light source does not imply that the light source is not available, when the ambient light source is 500 lux, the optical sensor is calibrated with 500 lux, and when the ambient light source is 400 lux, the optical sensor may also be calibrated with 400 lux, which are different in the calculation formula and calibration coefficient. Therefore, when the second parameter detection value of the ambient light is less than the preset second threshold, the color temperature of the ambient light source is collected and detected, such as the color temperature detection value may be detected and obtained through an illuminometer, and the standard of the calibration is replaced according to the color temperature detection value, such as the replacement of the calibration coefficient, so that the current color temperature detection value may also be configured to perform the parameter calibration as a reference value, and a service life of the ambient light source is prolonged.

In some embodiments, the detection module 401 is further configured to: determine whether a current illumination intensity detection value is stable. Even if the light source is aging, or performance of the light source gradually decreases, but when the light source is stable within a certain range, or the aging curve of the light source is predictable, the light source may further be configured for testing to prolong the service life of the light source. Therefore, when the illumination intensity detection value is stabilized within a third threshold within during preset second time range, or collected illumination intensity detection value is linearly changed, it is determined that the current illumination intensity detection value is stable.

In some embodiments, the corresponding relationship of parameters of the detection module 401 may be: when the first parameter detection value is a color temperature detection value, the second parameter detection value is an illumination intensity detection value; or, when the first parameter detection value is an illumination intensity detection value, the second parameter detection value is a spectral detection value. It may be understood that, the corresponding relationship is only an embodiment of the present disclosure and does not limit the scope of the claim of the present disclosure.

Therefore, the first parameter detection values and the second parameter detection values of the ambient light may be obtained based on the illumination intensity detection value. When the first parameter detection values do not satisfy the preset first condition, it reflects that the illumination intensity changes, and it may be determined that other parameters determined based on the illumination intensity are unavailable, at this time, collecting and/or analyzing the second parameter detection values is stopped or suspended, or the second parameter detection values collected when not satisfying the preset second condition are not adopted to prevent from calibrating based on incorrect parameters. When the first parameter detection value satisfies the preset first condition, the optical sensor is calibrated according to the collected second parameter detection value.

It may be understood that, the screening module 402 may introduce a third parameter detection value not related with the current calibration value. A technical effect of monitoring environment of the present disclosure may achieve by monitoring the third parameter detection value. The third parameter detection value may be one of the illumination intensity, the color temperature, the stroboscopic value and the illumination intensity, and a type of the third parameter detection value is different from the types of the first parameter detection value and the second parameter detection value. The specific operation method for calibrating and computation method in the embodiments of the apparatus have been explained in the above method embodiments and will not be repeated here.

In one embodiment, an optical sensor is disclosed, and optical parameters of the optical sensor are calibrated according to any one method of the present disclosure.

Figure 5:
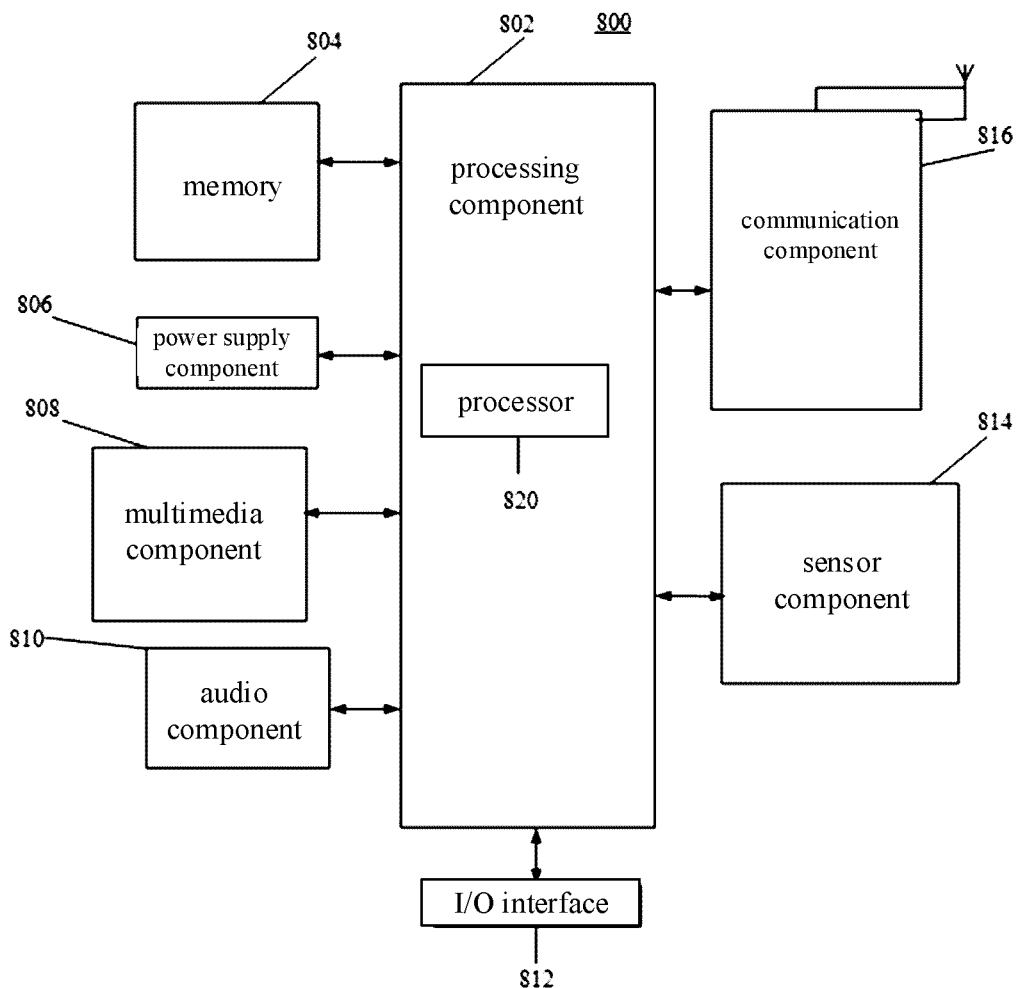
FIG. 5 is a block diagram illustrating an electronic device according to an example embodiment.

FIG. 5 is a block diagram illustrating an electronic device according to an example embodiment. The electronic device has an optical sensor, and the optical sensor is calibrated according to one of methods for calibrating the optical sensor.

For example, the electronic device may be a mobile phone, a computer, etc. In some embodiments of the present disclosure, an electronic device may be further provided. The electronic device may input information and is communicatively coupled to a cloud server and performs function configuration according to one of the above method embodiments.

Referring to FIG. 5, the apparatus 800 may include one or more components: a processing component 802, a memory 804, a power supply component 806, a multimedia component 808, an audio component 810, an input/output (I/O) interface 812, a sensor component 814, and a communication component 816.

The processing component 802 generally controls the whole operation of the apparatus 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the apparatus 800. Examples of the data include the instructions of any applications or methods operated on apparatus 800, contact data, phone book data, messages, pictures, videos, etc. The memory 804 may be implemented by any type of volatile or non-volatile storage devices or their combination, such as Static Random-Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), Magnetic Memory, Flash Memory, Magnetic Disk or Optical Disk.

The power supply component 806 may provide power supply for all components of the apparatus 800. The power supply component 806 may include power supply management system, one or more power supplies, and other units related to generating, managing and distributing power for the apparatus 800.

The multimedia component 808 includes an output interface screen provided between the apparatus 800 and the user. In some embodiments, a screen may include a liquid crystal display (LCD) and a touch panel (TP). If the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 808 include a front camera and/or a rear camera. When the apparatus 800 is in operation mode, such as shooting mode or video mode, the front camera or the rear camera may receive the external multimedia data. Each front camera and rear camera may be a fixed optical lens system or an optical lens system with focal length and optical zoom capacity.

The audio component 810 is configured as output and/or input signal. For example, the audio component 810 includes a microphone (MIC). When the apparatus 800 is in operation mode, such as call mode, record mode, and speech recognition mode, the microphone is configured to receive the external audio signals. The audio signals received may be further stored in the memory 804 or sent via the communication component 816. In some embodiments, the audio component 810 further includes a speaker configured to an output audio signal.

The interface 812 provides an interface for the processing component 802 and the peripheral interface module, and the peripheral interface module may be a keyboard, a click wheel, a button, etc. The buttons may include but not limited to a home button, a volume button, a start button and a lock button.

The sensor component 814 includes one or more sensors, configured to provide various aspects of status assessment for the apparatus 800. For example, the sensor component 814 may detect the on/off state of the apparatus 800 and the relative positioning of the component. For example, the component is a display and a keypad of the apparatus 800. The sensor component 814 may further detect the location change of the apparatus 800 or one component of the apparatus 800, the presence or absence of contact between the user and the apparatus 800, the orientation or acceleration/deceleration of the apparatus 800, and the temperature change of the apparatus 800. The sensor component 814 may include a proximity sensor, which is configured to detect the existence of the objects nearby without any physical contact. The sensor component 814 may further include an optical sensor such as CMOS or CCD image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the apparatus 800 and other devices. The apparatus 800 may access wireless networks based on communication standard, such as WiFi, 2G or 3G, or their combination. In an exemplary embodiment, the communication component 816 receives broadcast signals or broadcast-related information from an external broadcast management system via a broadcast channel. In an exemplary embodiment, the communication component 816 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an exemplary embodiment, the apparatus 800 may be implemented by one or more application specific integrated circuits(ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present invention is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for calibrating an optical sensor, comprising:
acquiring a plurality of spectral detection values of ambient light collected by the optical sensor;
acquiring a plurality of first parameter detection values of the ambient light and a plurality of second parameter detection values of the ambient light according to the plurality of spectral detection values, a type of the first parameter detection values being different from a type of the second parameter detection values;
determining at least one effective detection value from the plurality of first parameter detection values according to the plurality of second parameter detection values; and
calibrating the optical sensor according to the at least one effective detection value.

2. The method of claim 1, wherein determining the at least one effective detection value from the plurality of first parameter detection values according to the plurality of second parameter detection values comprises:
when any second parameter detection value satisfies a preset interval, determining the first parameter detection value corresponding to the second parameter detection value as the effective detection value.

3. The method of claim 2, further comprising:
determining whether any first parameter detection value and a corresponding second parameter detection value satisfy a function relationship;
when determining to satisfy the function relationship, determining the first parameter detection value corresponding to the second parameter detection value as the effective detection value.

4. The method of claim 1, wherein, the first parameter detection value is one of an illumination intensity detection value, a color temperature detection value, a stroboscopic detection value, and a spectral detection value, and the second parameter detection value is one of an illumination intensity detection value, a color temperature detection value, a stroboscopic detection value, and a spectral detection value.

5. The method of claim 2, further comprising:
acquiring a numerical fluctuation value of any second parameter detection value within a preset first time range;
when the numerical fluctuation value of the second parameter detection value is less than or equal to a preset first threshold, determining the first parameter detection value corresponding to the second parameter detection value as the effective detection value.

6. The method of claim 3, wherein, the function relationship is obtained by:
acquiring a standard value of any first parameter detection value;
obtaining a function relationship between the first parameter detection value and the standard value according to the standard value.

7. The method of claim 6, further comprising:
when the second parameter detection value of the ambient light less than a preset second threshold, collecting and detecting one or more values of an illumination intensity value, a color temperature value and a stroboscopic value of the ambient light through an illuminometer, and replacing the standard value according to the one or more values.

8. The method of claim 1, further comprising:
determining whether a current illumination intensity detection value of the ambient light is stable, wherein, when illumination intensity detection values are stabilized within a third threshold during a preset second time range, or collected illumination intensity detection values are linearly changed, determining that the current illumination intensity detection value is stable.

9. The method of claim 1, wherein,
the corresponding relationship of the parameters is:
when the first parameter detection value is a color temperature detection value, the second parameter detection value is an illumination intensity detection value;

or,
when the first parameter detection value is an illumination intensity detection value, the second parameter detection value is a spectral detection value.

10. An optical sensor comprising a processor, wherein, optical parameters of the optical sensor are calibrated by the processor when a method for calibrating an optical sensor is performed by the processor, and the method comprises:
acquiring a plurality of spectral detection values of ambient light collected by the optical sensor;
acquiring a plurality of first parameter detection values of the ambient light and a plurality of second parameter detection values of the ambient light according to the plurality of spectral detection values, a type of the first parameter detection values being different from a type of the second parameter detection values;
determining at least one effective detection value from the plurality of first parameter detection values according to the plurality of second parameter detection values; and
calibrating the optical sensor according to the at least one effective detection value.

11. The optical sensor of claim 10, wherein determining the at least one effective detection value from the plurality of first parameter detection values according to the plurality of second parameter detection values comprises:
when any second parameter detection value satisfies a preset interval, determining the first parameter detection value corresponding to the second parameter detection value as the effective detection value.

12. The optical sensor of claim 11, wherein the method further comprises:
determining whether any first parameter detection value and a corresponding second parameter detection value satisfy a function relationship;
when determining to satisfy the function relationship, determining the first parameter detection value corresponding to the second parameter detection value as the effective detection value.

13. The optical sensor of claim 10, wherein, the first parameter detection value is one of an illumination intensity detection value, a color temperature detection value, a stroboscopic detection value, and a spectral detection value, and the second parameter detection value is one of an illumination intensity detection value, a color temperature detection value, a stroboscopic detection value, and a spectral detection value.

14. The optical sensor of claim 11, wherein the method further comprises:
acquiring a numerical fluctuation value of any second parameter detection value within a preset first time range;
when the numerical fluctuation value of the second parameter detection value is less than or equal to a preset first threshold, determining the first parameter detection value corresponding to the second parameter detection value as the effective detection value.

15. The optical sensor of claim 12, wherein, the function relationship is obtained by:
acquiring a standard value of any first parameter detection value;
obtaining a function relationship between the first parameter detection value and the standard value according to the standard value.

16. The optical sensor of claim 15, wherein, the method further comprises:
when the second parameter detection value of the ambient light less than a preset second threshold, collecting and detecting one or more values of an illumination intensity value, a color temperature value and a stroboscopic value of the ambient light through an illuminometer, and replacing the standard value according to the one or more values.

17. The optical sensor of claim 10, wherein, the method further comprises:
determining whether a current illumination intensity detection value of the ambient light is stable, wherein, when illumination intensity detection values are stabilized within a third threshold during a preset second time range, or collected illumination intensity detection values are linearly changed, determining that the current illumination intensity detection value is stable.

18. The optical sensor of claim 10, wherein,
the corresponding relationship of the parameters is:
when the first parameter detection value is a color temperature detection value, the second parameter detection value is an illumination intensity detection value;
or,
when the first parameter detection value is an illumination intensity detection value, the second parameter detection value is a spectral detection value.

19. An electronic device, comprising an optical sensor and a processor, wherein optical parameters of the optical sensor are calibrated by the processor when according to a method for calibrating an optical sensor is performed by the processor, and the method comprises:
acquiring a plurality of spectral detection values of ambient light collected by the optical sensor;
acquiring a plurality of first parameter detection values of the ambient light and a plurality of second parameter detection values of the ambient light according to the plurality of spectral detection values, a type of the first parameter detection values being different from a type of the second parameter detection values;
determining at least one effective detection value from the plurality of first parameter detection values according to the plurality of second parameter detection values; and
calibrating the optical sensor according to the at least one effective detection value.

20. The electronic device of claim 19, wherein determining the at least one effective detection value from the plurality of first parameter detection values according to the plurality of second parameter detection values comprises:
when any second parameter detection value satisfies a preset interval, determining the first parameter detection value corresponding to the second parameter detection value as the effective detection value.

* * * * *